United States Patent [19]
Sako et al.

[11] Patent Number: 5,802,174
[45] Date of Patent: Sep. 1, 1998

[54] DATA RECORDING MEDIUM

[75] Inventors: Yoichiro Sako, Chiba; Hideo Owa, Kanagawa; Yoshitomo Osawa, Kanagawa; Akira Kurihara, Kanagawa; Isao Kawashima, Kanagawa, all of Japan

[73] Assignee: Sony Corporation, Tokyo, Japan

[21] Appl. No.: 670,535

[22] Filed: Jun. 27, 1996

[30] Foreign Application Priority Data

Jun. 30, 1995 [JP] Japan ................................. 7-166645

[51] Int. Cl.$^6$ ................................. H04L 9/00
[52] U.S. Cl. ................................. 380/4
[58] Field of Search ................................. 380/4

[56] References Cited

U.S. PATENT DOCUMENTS 5,150,339  9/1992  Ueda et al. .
5,371,792  12/1994 Asai et al. ................................. 380/4
5,596,639  1/1997  Kikinis ................................. 380/4

FOREIGN PATENT DOCUMENTS

| | | |
|---|---|---|
| 0 273 384 A | 7/1988 | European Pat. Off. . |
| A-0 426 409 | 5/1991 | European Pat. Off. . |
| 0 508 762 A | 10/1992 | European Pat. Off. . |
| A-0 545 472 | 6/1993 | European Pat. Off. . |
| A-0 565 281 | 10/1993 | European Pat. Off. . |
| 0 628 952 A | 12/1994 | European Pat. Off. . |
| A-0 634 741 | 1/1995 | European Pat. Off. . |

*Primary Examiner*—David C. Cain
*Attorney, Agent, or Firm*—Frommer Lawrence & Haug LLP; William S. Frommer

[57] ABSTRACT

An optical disk D is composed of a first recording layer $L_1$ and a second recording layer $L_2$ each for two recording formats. Encrypted data is recorded on the first recording layer $L_1$. Encrypting key data is recorded on the second recording layer $L_2$. The encrypting key data is used for decoding the encrypted data. This recording makes easy reproduction of the recorded data quite difficult. If data recorded on a bit-formed portion may be reproduced by any means, the data signal recorded on the optical disk cannot be easily reproduced.

28 Claims, 5 Drawing Sheets

DATA RECORDING MEDIUM

BACKGROUND OF THE INVENTION

1. Field of the Invention

The present invention relates to a medium for recording a data signal, a method for recording data on the data recording medium, and a method for reproducing data from the data recording medium.

2. Description of the Related Art

Of data recording mediums for recording a data signal such as audio data, video data or various kinds of data, a medium for optically recording such a data signal is made worldwide popular. The optical recording medium concretely contains a so-called compact disk for music or a CD-ROM that is a converted version from the CD for music into that for data.

Concurrently with the worldwide prevail of the CD and the CD-ROM, lots of pirated editions of an original medium are likely to be floating around the world. Of these pirated editions, some malignant editions are found out. For example, the malignant edition is created to strip a protective layer off a compact disk so that an aluminium layer (that is, the layer on where pits are formed) may be exposed out, coat a plating layer on the aluminium layer, and repetitively stamp the plated layer for reproducing many duplications. It is quite difficult to defend the original edition against this kind of malignant one.

As a method for preventing illegal copying of an original compact disk, as disclosed in Japanese Laid-open No. Hei 7-182766, a method has been proposed for recording on the compact disk secret data disabled to copy. This method is not so effective for the above-indicated physical illegal copy.

Moreover, the aforementioned problem is quite serious in a digital video disk (DVD) that is called a next-generation data recording medium.

SUMMARY OF THE INVENTION

Under the foregoing circumstances, it is an object of the present invention to provide a data recording medium, a data recording method and a data reproducing method which are arranged to inhibit easy reproduction of an original edition and easy reproduction of a recorded data signal even if a pit-formed layer of the data recording medium can be reproduced by any means.

According to the present invention, encrypted data to be originally recorded and key data for solving the encryption are recorded on the corresponding recording areas whose recording formats or layers are different from each other. Or the content data is recorded over at least two recording areas whose recording formats or layers are different from each other. This method inhibits easy reproduction of the original data or makes it difficult to reproduce the data recorded on an area even if the data recorded on the other area can be reproduced by any means. Hence, this method inhibits to easily obtain the final data (reproduced data).

The data recording medium according to the present invention includes at least two recording areas having the corresponding recording formats or layers. To solve the above-indicated problem, the encrypted data is recorded on one recording area and at least part of key data for solving the encryption of the encrypted data is recorded on the other area. Or, the content data is recorded over at least two recording areas.

Further, the data recording method according to the present invention is a method for recording the data on the data recording medium having at least two recording areas whose recording formats or layers are different from each other. On one recording area, the encrypted content data is recorded. On the other recording area, at least part of the key data for solving the encryption of the encrypted data is recorded. Or, the content data is recorded over at least two recording areas.

Further, the data reproducing method according to the present invention is a method for reproducing the data from the data recording medium having at least two recording areas whose recording formats or layers are different from each other. To solve the above-indicated problem, this method takes the steps of reading the data recorded over at least two recording areas out thereof and synthesizing the data read from the areas with each other.

In operation, the encrypted data and the key data for solving the encryption of the encrypted data are recorded on the corresponding recording areas of at least two areas whose recording format or layers are different from each other. Or, the content data to be recorded extends over at least two recording areas whose recording formats or layers are different from each other. For example, even if the content of the data recorded on one recording area can be reproduced by any means, the difficulty of the reproduction of the data recorded on the other area makes it impossible to obtain the final data (reproduced data).

DESCRIPTION OF THE PREFERRED EMBODIMENTS

Later, the present invention will be described along the preferred embodiments with reference to the drawings.

At first, the description will be oriented to the use of an optical disk having two recording layers with the corresponding recording formats as a data recording medium.

Figure 1:
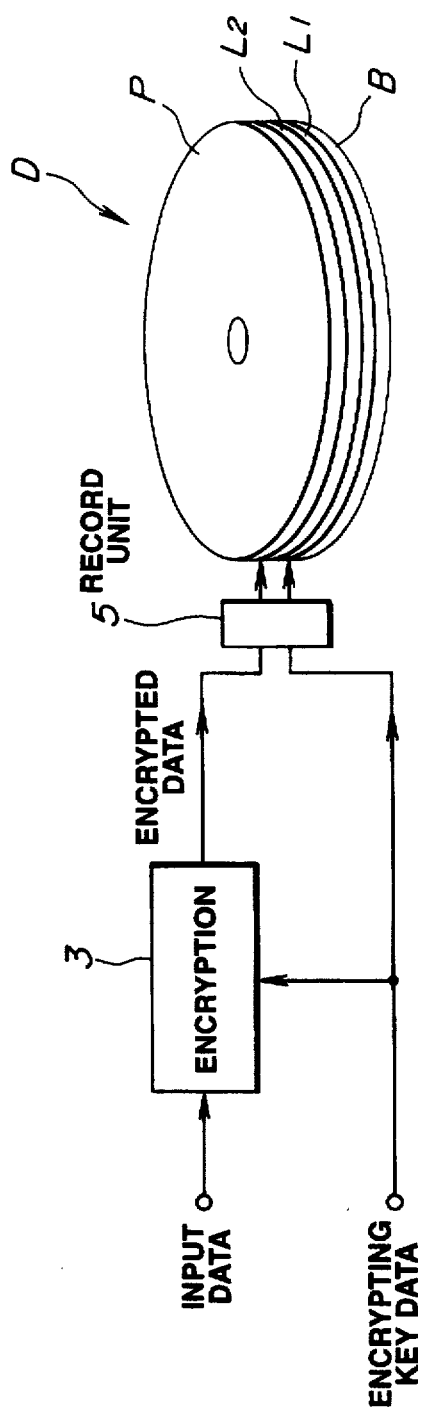
FIG. 1 is an explanatory view showing encrypted data, encrypting key data and an optical disk for recording them according to an embodiment of the present invention.

In this embodiment, an optical disk D is, as shown in FIG. 1, formed to have a base plate B, a first and a second recording layers $L_1$ and $L_2$ laminated on the plate B in sequence, and a transparent protective layer P formed on the top of the recording layer. As an example, encrypted data is recorded on the first recording layer $L_1$. Key data (called "encrypting key data") for solving encryption (called "decoding") of the encrypted data is recorded on the second recording layer $L_2$. The encrypted data to be recorded on the first recording layer $L_1$ of the optical disk D is content data (that is, data to be recorded) encrypted on the encrypting key data by an encrypting circuit 3. Also, the encrypted data and the encrypting key data are provided a record unit 5 such as light pickup device. Thereafter, each of the encrypted data and the encrypting key data is recorded on each of the first recording layer $L_1$ and the second recording layer $L_2$ by changing a focus of the light pickup device. Further, the information indicating whether or not the encrypting key data is recorded on the second recordibg layer $L_2$ of the optical disk D is recorded on TOC (table of contents) of the first recording layer $L_1$ of the optical disk D. TOC area is described in detail later.

Figure 2:
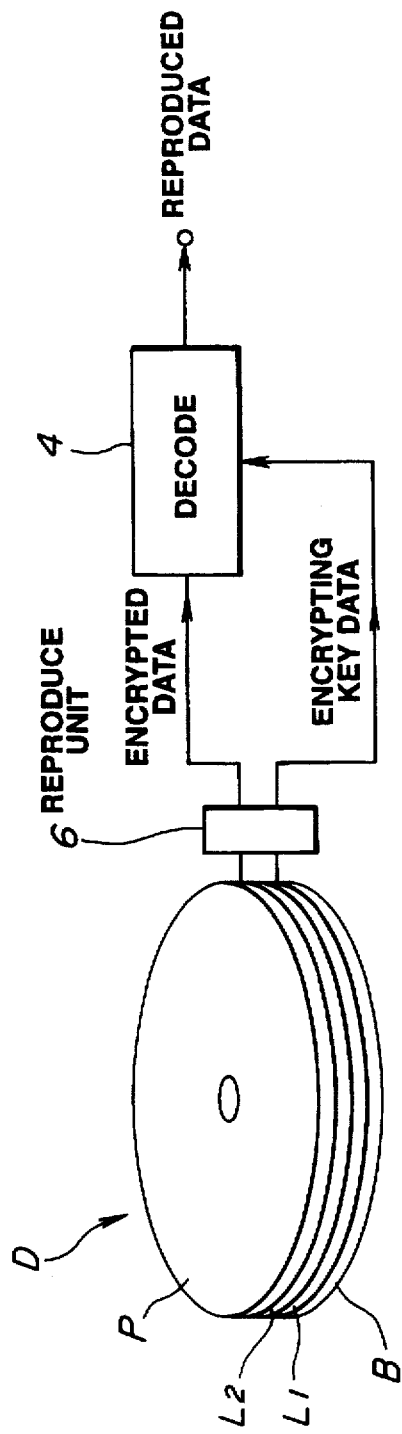
FIG. 2 is an explanatory view showing an arrangement of reading the encrypted data and the encrypting key data from an optical disk and decoding the encrypted data according to the embodiment of the present invention.

On the other hand, when reproducing the optical disk D, as shown in FIG. 2, the encrypted data recorded on the first recording layer $L_1$ and the encrypting key data recorded on the second recording layer $L_2$ are read out of the optical disk D by a reproduce unit such as a light pickup device, by changing a focus of the light pickup device. The read data are sent to a decoding circuit 4, in which the encrypted data is decoded on the encrypting key data. The decoded data is the content data reproduced from the optical disk D. More concretely, the decoding circuit 4 operates to generate the decoding key data based on the encrypting key data and decode the encrypted data based on this decoding key data.

In addition, FIGS. 1 and 2 show plural recording layers laminated on one side of the optical disk D. The recording layers may be laminated on both sides of the optical disk D.

Figure 3:
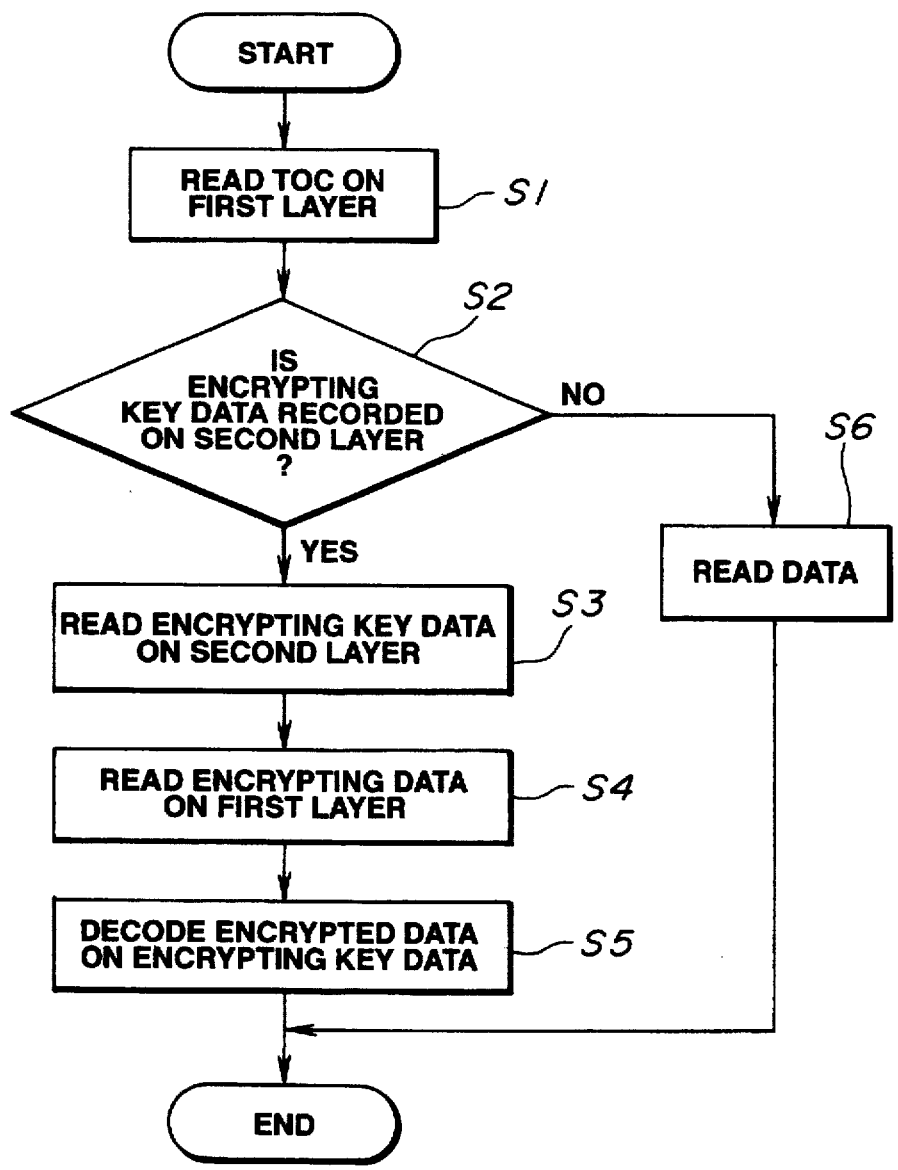
FIG. 3 is a flowchart showing a flow of data from an optical disk to a reproducing process according to the embodiment of the present invention.
Figure 4:
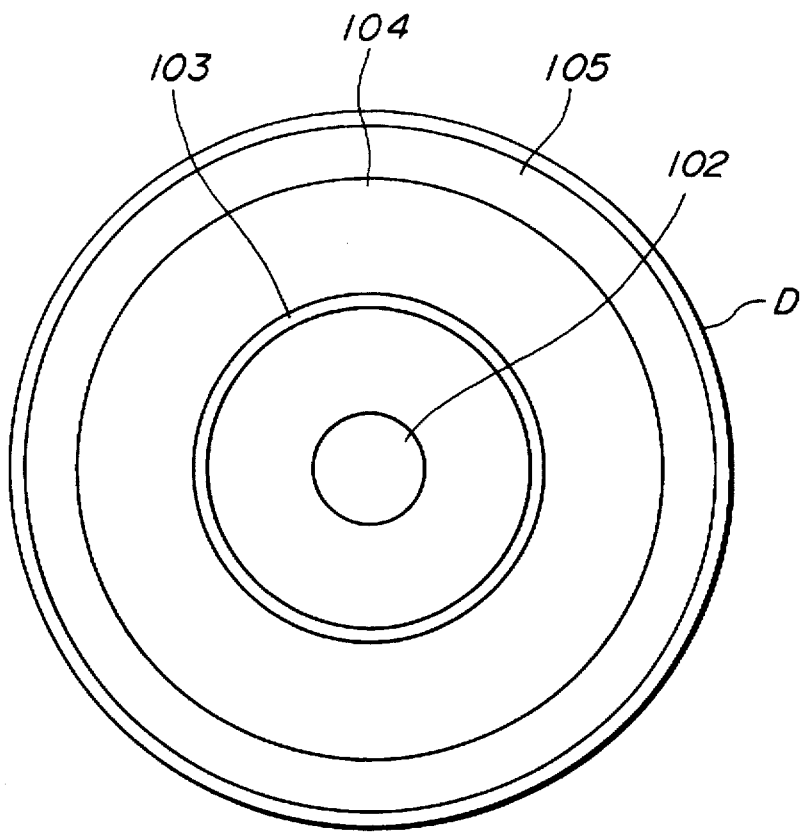
FIG. 4 is an explanatory view showing an arrangement of the optical disk according to the embodiment of the present invention.

The flow of processes in reproducing the data from the optical disk D will be shown in FIG. 3. The optical disk D, as shown in FIG. 4, includes a center hole 102 in the center of the disk, a lead-in area 103 corresponding to a TOC (table of contents) area served as a program-managing area, a data area 104 for recording data, and a lead-out area 105 corresponding to the data termination area ranged in the describing sequence from the inner periphery to the outer one. As an example, on the TOC area located at the innermost periphery of the first recording layer $L_1$ of the optical disk D recorded is the information indicating whether or not the encrypting key data is recorded on the second recording layer $L_2$.

As shown in FIG. 3, at a step S1, a process is executed to read the information recorded on the TOC area of the first recording layer $L_1$, that is, the first layer of the optical disk D.

Then, at a step S2, based on the information recorded on the TOC area, it is determined whether or not the encrypting key data is recorded on the second layer of the optical disk D, that is, the second recording layer $L_2$. If not at the step S2, the operation goes to a step S6. If no encrypting key data is determined to be recorded at the step S2, it means that the data recorded on the first recording layer $L_1$ is data that is not encrypted. Hence, at the step S6, the data is read out of the first recording layer $L_1$ as it is. On the contrary, if, at the step S2, the encrypting key information is determined to be recorded on the second recording layer $L_2$, the operation goes to a step S3.

At the step S3, the encrypting key data is read out of the second recording layer $L_2$. At a next step S4, the encrypted data is read out of the first recording layer $L_1$.

At a next step S5, based on the encrypting key data read out of the second recording layer $L_2$, the encrypted data read out of the first recording layer $L_1$ is decoded.

As mentioned above, according to this embodiment, the encrypted data is recorded on the first recording layer $L_1$ of the optical disk D. The encrypting key data is recorded on the second recording layer $L_2$ that is different from the first recording layer $L_1$. Even if, therefore, a pirated edition of the original disk may be created by stripping the protective layer P and the like off the first recording layer $L_1$ for exposing out the layer $L_1$, coating a layer like a plating one on the first recording layer $L_1$, the reproduction of the encrypting key data recorded on the second recording layer $L_2$ is not made so easy. Also, it is difficult to strip the first recording layer $L_1$ from the second recording layer $L_2$ of the optical disk D. On the optical disk D of this embodiment, hence, the original data is disallowed to be reproduced from the encrypted data recorded on the first recording layer $L_1$.

In the foregoing embodiment, the description will be oriented to the optical disk D having the first and the second recording layers $L_1$ and $L_2$ for the two recording formats. In addition, the recording areas for these two recording formats may be a combination of a magneto-optical recording area and a pit type recording area, a combination of a phase variable recording area and the pit type recording area, a combination of an organic coloring matter type recording area and the pit type recording area, or a recording medium for recording data with an ultraviolet laser beam and the pit type recording area. In these combinations, the encrypted data is recorded on the pit type recording area and the encrypting key data is recorded on the magneto-optical recording area, the phase variable type one, the organic coloring matter type one, or the recording medium for recording data with the ultraviolet laser beam. Moreover, as another combination of the recording mediums for the two recording formats, it is possible to select a combination of a recording area whose groups are made variable on the disk, that is, a so-called wobbling type recording area and one of the above-mentioned recording areas such as the pit type one, the magneto-optical one, the phase variable type one, and the organic coloring matter type one. In this combination, for example, the encrypting key data may be recorded on the wobbling type recording area.

As described above, if one of the two recording areas is the pit type area the data of which may be more easily reproduced than the other type areas, the other recording area may be the magneto-optical area, the phase variable type area, the organic coloring matter type area, or the area for recording data with the ultraviolet laser beam, from each of which the recorded data is difficult to be reproduced. In this combination, for example, even if a pirated edition of the original disk can be created by stripping the protective layer P off the recording area for exposing out the recording area and coating a plating layer on the pit type recording area, it is quite difficult to reproduce the other recording area. It means that no original data is allowed to be reproduced from the optical disk.

The above-indicated data recording with an ultraviolet laser beam is operated as follows: A suitable ultraviolet laser beam to working a material of the optical disk is applied to a plate of the optical disk composed of polycarbonate or acrylic. An ablation takes place on the portion on which the ultraviolet laser beam spot hits. The ablation results in eroding the hit portions and thereby forming pits on the plate. Hence, the data recording area with the ultraviolet laser beam may be formed on a portion except the pit-formed recording area for the content data. As indicated above, since the encrypting key data may be formed on the portion except the original recording area, the duplication of the data is made substantially impossible. Further, the polycabonate serves to absorb a ray having a wavelength of about 290 nm or less. The acrylic serves to absorb a ray having a wavelength of about 350 nm or less. The ultraviolet laser beam having a wavelength of 190 nm or less is absorbed by the air. In light of these properties, for decomposing the plate of the optical disk through light, the ultraviolet laser beam is recommended to have a wavelength of 190 to 370 nm.

In the foregoing embodiments, the overall encrypting key data is not necessarily recorded on the optical disk. It is possible that, e.g., only part of the encrypting key data is recorded and the remaining part may be entered from an external input unit.

Next, the pair of recording formats include pit-forming as one recording format and marking on the disk with a high-output laser as the other format. In this pair, the encrypted data is recorded on the pit-forming type recording area, while the encrypting key data composed of alphanumeric codes (so-called SID codes), for example, is marked on the inner peripheral portion of the optical disk by applying the high-output laser onto the optical disk. If the data disallowed to be read by a light pickup device is used as the encrypting key data, the encrypting key data composed of alphanumeric codes is entered into the optical disk reproducing apparatus through the effect of an external input unit such as a keyboard. The optical disk reproducing apparatus operates to decode the encrypted data based on the encrypting key data entered from the external input unit. In the above-indicated case, even if the data recorded on the pit-formed recording area may be reproduced, no original data can be reproduced from the optical disk unless the encrypting key data composed of alphanumeric codes is entered from the external input unit.

Figure 5:
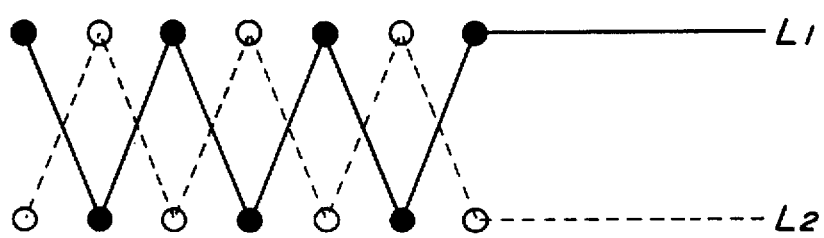
FIG. 5 is an explanatory view showing a format of recording content data over a first and a second recording layers.

In case the optical disk D contains the foregoing first and the second recording layers $L_1$ and $L_2$ as the recording areas for the two recording formats, as shown in FIG. 5, the data is recorded alternately on the first and the second recording layers $L_1$ and $L_2$ for preventing the incorrect duplication of the data. That is, in the case of the recording as shown in FIG. 5, if an pirated edition of the original disk may be created by stripping the protecting layer P off the first recording layer $L_1$ for exposing out the layer $L_1$, the reproduction of the data recorded on the layer $L_2$ is made substantially impossible. Hence, the data recorded on the optical disk D is disallowed to be reproduced. It means that the pirated edition of the original disk cannot be simply created. The data to be recorded alternately on the first and the second recording layer $L_1$ and $L_2$ may be recorded every 1 bit or every several bits greater than 1 bit.

The data recorded alternately on the first and the second recording layers $L_1$ and $L_2$ are not necessarily encrypted. When reproducing the data from the optical disk, the operation is executed to read the data recorded alternately on the first and the second recording layers $L_1$ and $L_2$ and combine the data recorded on the first layer $L_1$ and the data recorded on the second layer $L_2$ with each other for composing the original data. Whether or not the optical disk employs the recording format as shown in FIG. 5 is determined by recording on the TOC area of the first layer $L_1$ the information indicating the use of the recording format as shown in FIG. 5 in the same way as the first embodiment. When reproducing the data from the optical disk, the data recorded over the first and the second layers $L_1$ and $L_2$ are read out according to the information recorded on the TOC area. Then, the data recorded on the first layer $L_1$ and the data recorded on the second layer $L_2$ are combined with each other for composing the original data.

The alternate reproduction of the data from the first and the second layers $L_1$ and $L_2$ is made quite difficult in light of the performance of the current light pickup device. In actual, hence, the reproducing operation is executed to read a piece of data recorded on the first layer $L_1$ by a predetermined length (for example, one sector), store the piece of data in memory, read a piece of data recorded on the second layer $L_2$ by a predetermined length (for example, one sector), store the piece of data in memory, and alternately read the data stored in these memories, and synthesize both pieces of data with each other, for reproducing the original data.

The combination of the encrypted data and the encrypting key data may be defined on each file for example, program data. In this case, however, it is necessary to record the identifying information for each file. This variation of the combination of both data at each file makes it possible to enhance the effect in preventing the reproduction of the original data.

Figure 6:
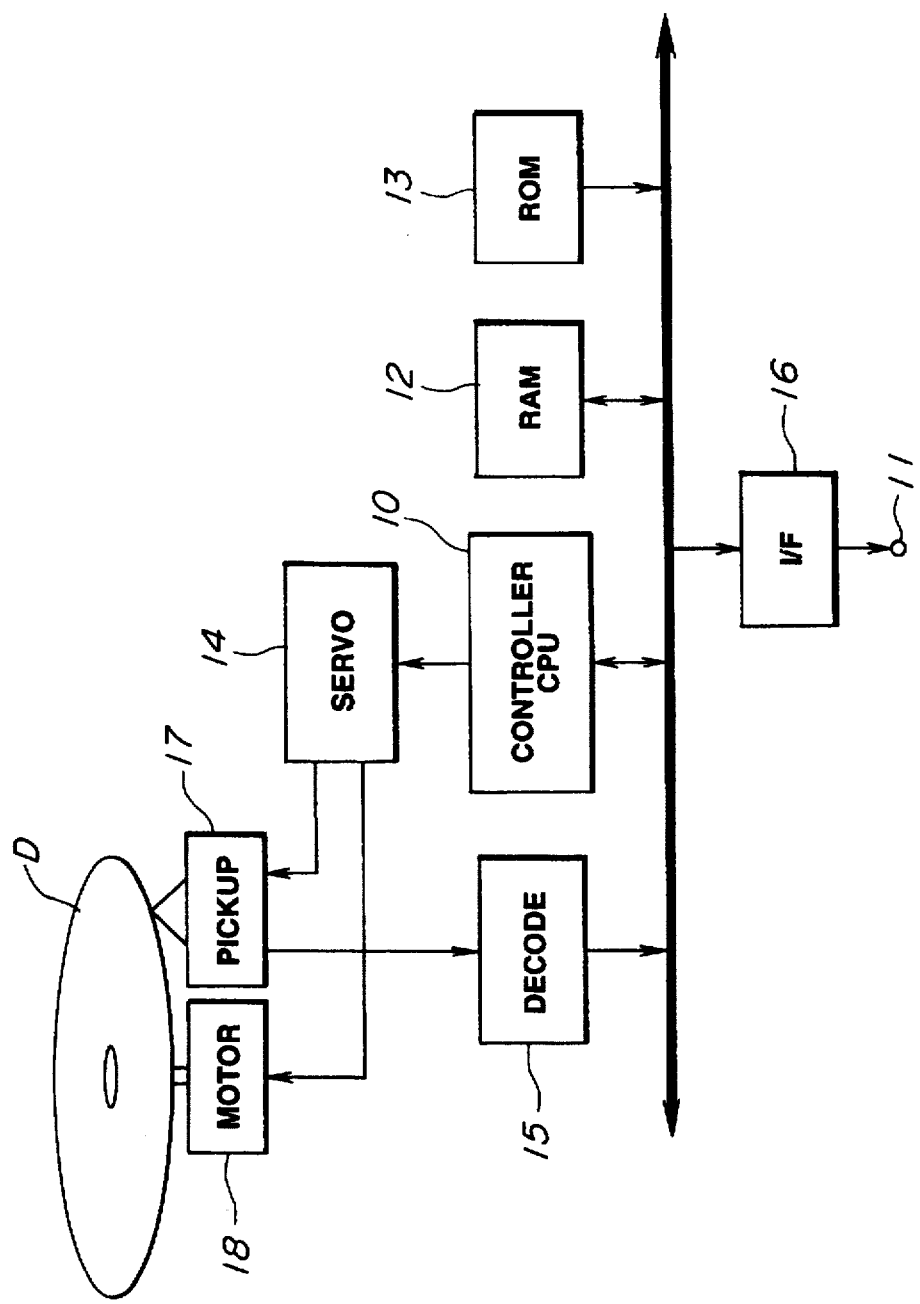
FIG. 6 is a circuit diagram showing a schematic arrangement of a reproducing apparatus for reproducing the optical disk according to the embodiment of the present invention.

Next, the description will be oriented to a schematic arrangement of the reproducing apparatus for reproducing the optical disk D included in the foregoing embodiments with reference to FIG. 6.

At first, the description concerns with the operation executed in the case of recording the encrypted data and the encrypting key data on the optical disk D. The follow of a fundamental operation is same to the followchat as shown in FIG. 3.

As shown in FIG. 6, a numeral 17 denotes a light pickup device. The light pickup device 17 operates to condense a laser beam on the optical disk D, receive a reflected laser beam, read a data signal recorded on the optical disk D, and then send the data signal to the decode circuit 15. Further, the light pickup device 17 operates to send to a servo circuit 14 a focus servo error signal and a tracking error signal produced on the reflected laser beam.

Under the control of the controller CPU 10, the servo circuit 14 operates to generate the focus servo error signal, a focus servo signal and a tracking error signal, the latter two of which correspond to the tracking error signal. Then, these signals are sent to the light pickup device 17. The servo circuit 14 also operates to supply a rotation servo signal for the optical disk D. The motor 18 is controlled in response to the rotation servo signal. Each of the encrypted data recorded on the first recording layer $L_1$ and the encrypting key data recorded on the second recording layer $L_2$ are read out of the optical disk D by changing a focus of the light pickup device.

On the other hand, the decode circuit 15 operates to decode and correct an error of the data signal sent from the light pickup device 17.

The encrypting key information, which has been read from the light disk D and decoded by the decode circuit 15, is stored in a working RAM 12 that is controlled by the controller CPU 10. The controller CPU 10 operates to decode the encrypted data read from the optical disk D and decoded by the decode circuit 15, based on the encrypting key data stored in the RAM 12. The program data to be used by the controller CPU 10 is stored in the program ROM 13.

The original data decoded by the above process is sent to the outside through an interface circuit 16 and an output terminal 11. On the other hand, if the data is recorded over two recording areas of the optical disk D, the following operation is executed.

The light pickup device 17 operates to read the data recorded over two recording areas of the optical disk D from each of the recording areas. The data read from each of the areas is decoded by the decode circuit 15 and then is stored in the working RAM 12 that is operated under the control of the controller CPU 10. That is, a piece of data recorded on the first layer $L_1$ by predetermined length is read out, the read data is decoded by decode circuit 15 and then is stored in the working RAM 12. Thereafter, by changing the focus of the light pickup device, other piece of data recorded on the second layer $L_2$ by the predetermined length is read out, the read data is decoded by decode circuit 15 and then is stored in the working RAM 12. The controller CPU 10 operates to read the data stored in the RAM 12 and the controller CPU 10 synthesize them with each other. The synthesized data results in being the content data.

We claim:

1. A medium for recording data comprising:

a plurality of working areas, at least a first of said working areas being adapted to record encrypted data in a first recording format, at least a second of said working areas being adapted to record at least part of key data used for decoding said encrypted data in a second recording format.

2. A medium for recording data comprising:

at least a first recording layer adapted to record encrypted data; and at least a second recording layer adapted to record at least part of key data used for decoding said encrypted data.

3. The medium for recording data as claimed in claim 2, wherein said first recording layer includes a predetermined area; and said second recording layer being adapted to record data without reference to said predetermined area.

4. A medium for recording data comprising:

a plurality of recording areas, at least a first of said recording areas being adapted to record data in a first recording format, and at least a second of said recording areas being adapted to record data in a second recording format, data to be recorded extending over at least said first and second recording areas.

5. A medium for recording data comprising:

a plurality of recording layers, each of said recording layers being adapted to record data, wherein data to be recorded on said medium extends over at least two of said recording layers.

6. The medium for recording data as claimed in claim 5, wherein a first of said recording layers includes a predetermined area; and a second of said recording layers being adapted to record data without reference to said predetermined area.

7. A method for recording data on a data recording medium having at least two recording areas adapted to record data in at least two recording formats, comprising the steps of:

recording encrypted data on one of said at least two recording areas; and recording at least part of key data used for decoding said encrypted data on a second of said at least two recording areas.

8. A method for recording data on a data recording medium having at least two recording layers adapted to record data thereon, comprising the steps of:

recording encrypted data on one of said at least two recording layers; and recording at least part of key data used for decoding said encrypted data on a second of said at least two recording areas.

9. The method for recording data as claimed in claim 8, wherein said one recording layer includes a predetermined area; and said second recording layer being adapted to record data without reference to said predetermined area.

10. A method for recording data on a data recording medium having a plurality of recording areas each being adapted to record data in one of at least two recording formats, comprising the step of:

recording data over at least two of said plurality of recording areas in different recording formats.

11. A method for recording data on a data recording medium having at least two recording layers adapted to record data thereon, comprising the step of:

recording data over at least two of said recording layers.

12. The method for recording data as claimed in claim 11, wherein a first of said recording layers includes a predetermined area; a second of said recording layers being adapted to record data without reference to said predetermined area.

13. A method for reproducing data from a data recording medium having a plurality of recording areas each having data recorded thereon in one of at least two recording formats, comprising the steps of:

reading encrypted data recorded on one of said plurality of recording areas;

reading at least a portion of key data used for decoding said encrypted data from a second of said plurality of recording areas; and decoding said encrypted data based on said key data.

14. A method for reproducing data from a data recording medium having at least two recording layers, comprising the steps of:

reading encrypted data recorded on one of said recording layers;

reading at least a portion of key data used for decoding said encrypted data from a second of said recording layers; and decoding said encrypted data based on said key data.

15. A method for reproducing data from a data recording medium having a plurality of recording areas each having data recorded thereon in one of at least two recording formats, comprising the steps of reading data recorded over at least two of said plurality of recording areas; and synthesizing data read from said at least two recording areas with each other.

16. A method for reproducing data from a data recording medium having at least two recording layers, comprising the steps of:

reading data recorded over said at least two recording layers; and synthesizing said data read from each of said at least two recording layers with each other.

17. An apparatus for recording data on a data recording medium having a plurality of recording areas, at least a first of said recording areas being adapted to record data in a first recording format, and at least a second of said recording areas being adapted to record data in a second recording format, comprising:

means for recording encrypted data on at least one of said plurality of recording areas; and means for recording at least part of key data used for decoding said encrypted data on at least another one of said plurality of recording areas.

18. An apparatus for recording data on a data recording medium having at least two recording layers, comprising:

means for recording encrypted data on one of said at least two recording layers; and means for recording at least part of key data used for decoding said encrypted data on another one of said at least two recording areas.

19. The data recording apparatus as claimed in claim 18, wherein said one recording layer includes a predetermined area; said other recording layer being adapted to record data without reference to said predetermined area.

20. An apparatus for recording data on a data recording medium having at least two recording areas corresponding to at least two recording formats, comprising:

means for recording data in one of said at least two recording areas in a first of said at least two recording formats; and means for recording data in a second of said at least two recording areas in a second of said at least two recording formats.

21. An apparatus for recording data on a data recording medium having at least two recording layers, comprising:

means for recording data over at least two recording layers; and alternating means for alternating which of said at least two recording layers data is recorded to.

22. The data recording apparatus as claimed in claim 21, wherein a first recording layer includes a predetermined area; and a second recording layer being adapted to record data without reference to said predetermined area.

23. An apparatus for reproducing data from a data recording medium having a plurality of recording areas each having data recorded thereon in one of at least two recording formats, comprising:

means for reading encrypted data from at least one of said plurality of recording areas;

means for reading at least a portion of key data used for decoding said encrypted data from at least a second one of said plurality of recording areas; and means for decoding said encrypted data based on said key data.

24. An apparatus for reproducing data from a data recording medium having at least two recording layers, comprising:

means for reading encrypted data from at least a first one of said recording layers;

means for reading key data used to encrypt said encrypted data from at least a second one of said recording layers; and means for decoding said encrypted data based on said key data.

25. The data reproducing apparatus as claimed in claim 24, wherein said first recording layer includes a predetermined area; said second recording layer being adapted to record data without reference to said predetermined area.

26. An apparatus for reproducing data from a data recording medium having a plurality of recording areas each having data recorded thereon in one of at least two recording formats, comprising:

means for reading recorded data which extends over at least two of said recording areas; and means for synthesizing said data read from each of said at least two recording areas with each other.

27. An apparatus for reproducing data from a data recording medium having at least two recording layers, comprising:

means for reading recorded data which extends over at least two of said recording layers; and means for synthesizing said data read from each of said at least two recording layers with each other.

28. The data reproducing apparatus as claimed in claim 27, wherein a first recording layer includes a predetermined area; and a second recording layer being adapted to record data without reference to said predetermined area.

* * * * *

(12) EX PARTE REEXAMINATION CERTIFICATE (7388th)
United States Patent
Sako et al.

(10) Number: US 5,802,174 C1
(45) Certificate Issued: Mar. 2, 2010

(54) DATA RECORDING MEDIUM

(75) Inventors: Yoichiro Sako, Chiba (JP); Hideo Owa, Kanagawa (JP); Yoshitomo Osawa, Kanagawa (JP); Akira Kurihara, Kanagawa (JP); Isao Kawashima, Kanagawa (JP)

(73) Assignee: Sony Corporation, Shinagawa-Ku, Tokyo (JP)

Reexamination Request:
No. 90/009,192, Jun. 19, 2008

Reexamination Certificate for:
Patent No.: 5,802,174
Issued: Sep. 1, 1998
Appl. No.: 08/670,535
Filed: Jun. 27, 1996

(30) Foreign Application Priority Data

Jun. 30, 1995 (JP) ............................................ 7-166645

(51) Int. Cl.
*H04L 9/00* (2006.01)

(52) U.S. Cl. .............. 380/201; 698/19.017; 698/20.002; 698/7.01; 698/7.018; 698/7.033; 698/7.139

(58) Field of Classification Search .................... 380/201
See application file for complete search history.

(56) References Cited

U.S. PATENT DOCUMENTS

| 5,371,792 | A | | 12/1994 | Asai et al. |
| 5,538,773 | A | | 7/1996 | Kondo |
| 5,677,953 | A | * | 10/1997 | Dolphin ....................... 705/51 |
| 5,724,327 | A | | 3/1998 | Timmermans et al. |
| 5,761,301 | A | * | 6/1998 | Oshima et al. ................ 705/57 |
| 5,881,038 | A | | 3/1999 | Oshima et al. |

FOREIGN PATENT DOCUMENTS

EP 273384 7/1998

\* cited by examiner

*Primary Examiner*—Matthew C. Graham

(57) ABSTRACT

An optical disk D is composed of a first recording layer $L_1$ and a second recording layer $L_2$ each for two recording formats. Encrypted data is recorded on the first recording layer $L_1$. Encrypting key data is recorded on the second recording layer $L_2$. The encrypting key data is used for decoding the encrypted data. This recording makes easy reproduction of the recorded data quite difficult. If data recorded on a bit-formed portion may be reproducted by any means, the data signal recorded on the optical disk cannot be easily reproduced.

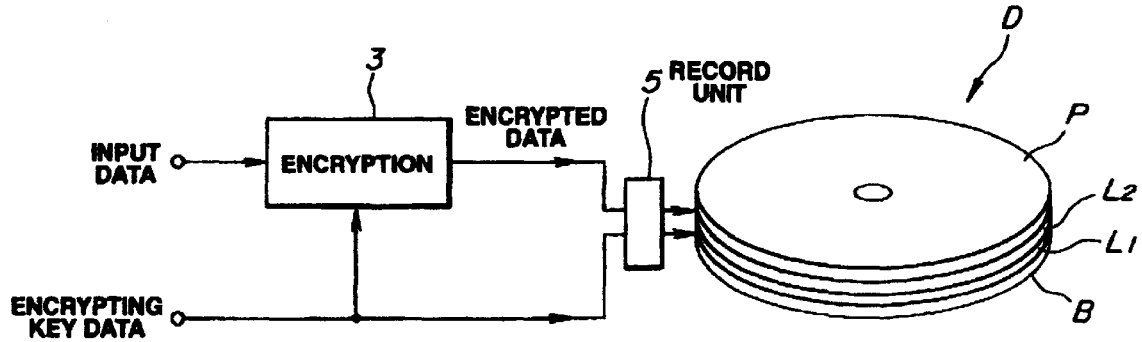

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–25 are determined to be patentable as amended.

Claims 26–28 were not reexamined.

1. A medium for recording data comprising:
a plurality of working areas, at least a first of said working areas being a [adapted to record] *a first recording layer and comprising recorded* encrypted data in a first recording format, at least a second of said working areas being [adapted to record at least] *a second recording layer comprising only a* part of *encryption* key data *recorded thereon* used for decoding said encrypted data in a second recording format, *wherein said only a part of encryption key data is recorded on said medium, a remaining part of said encryption key data being provided from an external device, and said medium having data recorded alternately on said first recording layer and said second recording layer.*

2. A medium for recording data comprising:
at least a first recording layer [adapted to record] *comprising recorded* encrypted data; and
at least a second recording layer [adapted to record at least] *comprising only a* part of *encryption* key data *recorded thereon* used for decoding said encrypted data, *wherein said only a part of encryption key data is recorded on said medium, a remaining part of said encryption key data being provided from an external device; and said medium having data recorded alternately on said first recording layer and said second recording layer.*

3. The medium for recording data as claimed in claim 2, wherein said first recording layer includes a predetermined area; and said second recording layer [being adapted to record] *comprising recorded* data without reference to said predetermined area.

4. A medium for recording data comprising:
a plurality of recording areas, at least a first of said recording areas [being adapted to record] *including a first recording layer and comprising recorded* data in a first recording format, and at least a second of said recording areas [being adapted to record] *including a second recording layer comprising recorded* data in a second recording format, data to be recorded extending over at least said first and second recording areas, *wherein only a part of encryption key data is recorded on said medium, a remaining part of said encryption key data being provided from an external device, and said medium having data recorded alternately on said first recording layer and said second recording layer.*

5. A medium for recording data comprising:
a plurality of recording layers, each of said recording layers [being adapted to record] *comprising recorded* data, wherein data to be recorded on said medium extends over at least two of said recording layers, *wherein only a part of encryption key data is recorded on said medium, a remaining part of said encryption key data being provided from an external device, said medium having data recorded alternately on two of said at least two of said recording layers.*

6. The medium for recording data as a claimed in claim 5, wherein a first of said recording layers includes a predetermined area; and a second of said recording layers [being adapted to record] *comprising recorded* data without reference to said predetermined area.

7. A method for recording data on a data recording medium having at least two recording areas [adapted to record] *comprising recorded* data in at least two recording formats, comprising the steps of:
recording encrypted data on one of said at least two recording areas; [and]
recording [at least] *only a* part of *encryption* key data used for decoding said encrypted data on a second of said at least two recording areas; *and*
*alternately recording data on two recording layers of said at least two recording areas, wherein*
*said only a part of encrytion key data is recorded on said data recording medium, a remaining part of said encryption key data being provided from an external device.*

8. A method for recording data on a data recording medium having at least two recording layers [adapted to record] *comprising recorded* data thereon, comprising the steps of:
recording encrypted data on one of said at least two recording layers; [and] recording [at least] *only a* part of *encryption* key data used for decoding said encrypted data on a second of said at least two recording areas; *and*
*alternately recording data on two of said at least two recording layers, wherein*
*said only a part of encryption key data is recorded on said data recording medium, a remaining part of said encryption key data being provided from an external device.*

9. The method for recording data as claimed in claim 8, wherein said one recording layer includes a predetermined area; and said second recording layer [being adapted to record] *comprising recorded* data without reference to said predetermined area.

10. A method for recording data on a data recording medium having a plurality of recording areas each [being adapted to record] *comprising recorded* data in one of at least two recording formats, comprising the step of:
alternately recording data over *two recording layers of* at least two of said plurality of recording areas in different recording formats, *wherein*
*only a part of encryption key data is recorded on said data recording medium, a remaining part of said encryption key data being provided from an external device.*

11. A method for recording data on a data recording medium having at least two recording layers [adapted to record] *comprising recorded* data thereon, comprising the step of:
alternately recording data over *two layers of said* at least two of said recording layers, *wherein*
*only a part of encryption key data is recorded on said data recording medium, a remaining part of said encryption key data being provided from an external device.*

12. The method for recording data as claimed in claim 11, wherein a first of said recording layers includes a predetermined area; a second of said recording layers [being adapted to record] *comprising recorded* data without reference to said predetermined area.

13. A method for reproducing data from a data recording medium having a plurality of recording areas each having data recoded thereon in one of at least two recording formats, comprising the steps of:

reading encrypted data recorded on one of said plurality of recording areas; reading [at least] a [portion] *part* of *encryption* key data used for decoding said encrypted data from a second of said plurality of recording areas; [and]

*reading data from two recording layers of said plurality of recording areas, said data being recorded alternately on said two layers; and* decoding said encrypted data based on said key data, *wherein*

*only the part of encryption key data is recorded on said date recording medium, a remaining part of said encryption key data being provided from an external device.*

14. A method for reproducing data from a data recording medium having at least two recording layers, comprising the steps of:

reading encrypted data recorded on one of said recording layers;

reading [at least] a [portion] *part* of *encryption* key data used for decoding said encrypted data from a second of said recording layers;

*reading data from two of said recording layers, said data being recorded alternately on said two recording layers*; and decoding said encrypted data based on said key data, *wherein*

*only the part of encryption key data is recorded on said data recording medium, a remaining part of said encryption key data being provided from an external device.*

15. A method for reproducing data from a data recording medium having a plurality of recording areas each having data recorded thereon in one of at least two recording formats, comprising the steps of reading data recorded over at least two of said plurality of recording areas; and synthesizing data read from said at least two recording areas with each other, *wherein*

*only a part of encryption key data is recorded on said data recording medium, a remaining part of said encryption key data being provided from an external device, and*

*said reading data step includes receiving data from two recording layers of said recording areas, said data being recorded alternately on said two recording layers.*

16. A method for reproducing data from a data recording medium having at least two recording layers, comprising the steps of:

reading data recorded *alternately* over *two of* said at least two recording layers; and synthesizing said data read from each of said at least two recording layers with each other, *wherein*

*only a part of encryption key data is recorded on said data recording medium, a remaining part of said encryption key data being provided from an external device.*

17. An apparatus for recording data on a data recording medium having a plurality of recording areas, at least a first of said recording areas [being adapted to record] *comprising recorded* data in a first recording format, and at least a second of said recording areas [being adapted to record] *comprising recorded* data in a second recording format, comprising:

means for recording encrypted data on at least one of said plurality of recording areas; [and]

means for recording [at least] *only a* part of key data used for decoding said encrypted data on at least another one of said plurality of recording areas;

*means for alternately recording data on two recording layers of said plurality of recording areas; and*

*wherein said only a part of encryption key data is recorded on said data recording medium, a remaining part of said encryption key data being provided from an external device.*

18. An apparatus for recording data on a data recording medium having at least two recording layers, comprising:

means for recording encrypted data on one of said at least two recording layers; [and]

means for recording [at least] *a* part of *encryption* key data used for decoding said encrypted data on another one of said at least two recording areasi ;

*means for alternately recording data on two of said at least two recording layers;*

*wherein only the part of encryption key data is recorded on said data recording medium, a remaining part of said encryption key data being provided from an external device.*

19. The data recording apparatus as claimed in claim 18, wherein said one recording layer includes a predetermined area; said other recording layer [being adapted to record] *comprising recorded* data without reference to said predetermined area.

20. An apparatus for recording data on a data recording medium having at least two recording areas corresponding to at least two recording formats, comprising:

means for recording data in one of said at least two recording areas in a first of said at least two recording formats; [and]

means for recording data in a second of said at least two recording areas in a second of said at least two recording formats*; and*

*means for recording data alternately on two recording layers of said at least two recording areas;*

*wherein only a part of encryption key data is recorded on said data recording medium, a remaining part of said encryption key data being provided from an external device.*

21. An apparatus for recording data on a data recording medium having at least two recording layers, comprising:

means for recording *encryption* data over at least two recording layers; and alternating means for alternating which of said at least two recording layers data is recorded to, *wherein*

*only a part of encryption key data is recorded on said data recording medium, a remaining part of said encryption key data being provided from an external device, and*

*said alternating means includes means for recording data alternately on two recording layers of said at least two recording layers.*

22. The data recording apparatus as claimed in claim 21, wherein a frsit recording layer includes a predetermined area; and a second recording layer [being adapted to record] *comprising recorded* data without reference to said predetermined area.

23. An apparatus for reproducing data from a data recording medium having a plurality of recording areas each having data recorded thereon in one of at least two recording formats, comprising:

means for reading encrypted data from at least one of said plurality of recording areas;

means for reading [at least a portion] *only a part of* encryption key data used for decoding said encrypted data from at least a second one of said plurality of recording areas; and

*means for alternately recording data on two recording layers of said plurality of recording areas; and* means for decoding said encrypted data based on said encryption key data, *wherein only a part of encryption key data is recorded on said data recording medium, a remaining part of said encryption key data being provided from an external device.*

24. An apparatus for reproducing data from a data recording medium having at least two recording layers, comprising:

means for reading encrypted data from at least a first one of said recording layers;

means for reading *a part of encryption* key data used to encrypt said encrypted data from at least a second one of said recording layers; [and]

*means for reading data from two of said recording layers, said data being recorded alternately on said two recording layers; and* means for decoding said encrypted data based on said *part of encryption* key data, *wherein*

*only a part of encryption key data is recorded on said data recording medium, a remaining part of said encryption key data being provided from an external device.*

25. The data reproducing apparatus as claimed in claim 24, wherein said first recording layer includes a predetermined area; said second recording layer [being adapted to record] *comprising recorded* data without reference to said predetermined area.

\* \* \* \* \*